US010029569B2

(12) United States Patent
Bakken et al.

(10) Patent No.: US 10,029,569 B2
(45) Date of Patent: Jul. 24, 2018

(54) METHOD AND APPARATUS FOR CONTROLLING THE DRIVE POWER OF A VEHICLE

(71) Applicant: Caterpillar Inc., Peoria, IL (US)

(72) Inventors: Arick Bakken, Raleigh, NC (US); Paul Cairns, Groby (GB); William Swick, Apex, NC (US)

(73) Assignee: Caterpillar Inc., Deerfield, IL (US)

( * ) Notice: Subject to any disclaimer, the term of this patent is extended or adjusted under 35 U.S.C. 154(b) by 432 days.

(21) Appl. No.: 14/759,120

(22) PCT Filed: Jan. 7, 2013

(86) PCT No.: PCT/US2013/020502
§ 371 (c)(1),
(2) Date: Jul. 2, 2015

(87) PCT Pub. No.: WO2014/107168
PCT Pub. Date: Jul. 10, 2014

(65) Prior Publication Data
US 2015/0336584 A1    Nov. 26, 2015

(51) Int. Cl.
*B60K 28/16*    (2006.01)
*B60W 30/18*    (2012.01)
(Continued)

(52) U.S. Cl.
CPC ..... *B60K 28/165* (2013.01); *B60W 30/18172* (2013.01); *F16H 61/472* (2013.01); *F16H 61/475* (2013.01); *B60W 2520/10* (2013.01); *B60W 2520/26* (2013.01); *B60W 2540/10* (2013.01); *B60W 2710/105* (2013.01); *B60W 2710/1055* (2013.01); *B60W 2710/1061* (2013.01)

(58) Field of Classification Search
CPC ............. B60K 28/165; B60K 28/16; B60W 30/18172; B60W 2710/1061; F16H 61/472; F16H 61/475
See application file for complete search history.

(56) References Cited

U.S. PATENT DOCUMENTS

| 6,684,145 B1 * | 1/2004 | Gianoglio | ............ F02D 41/021 |
| | | | 123/399 |
| 2002/0123836 A1 | 9/2002 | Komiyama et al. | |

(Continued)

FOREIGN PATENT DOCUMENTS

| CN | 101287899 | 10/2008 |
| CN | 101529135 | 9/2009 |

(Continued)

OTHER PUBLICATIONS

European Patent Office, International Search Report in International Patent Application No. PCT/US2013/020502, dated Sep. 16, 2013, 2 pages.

*Primary Examiner* — Huan Le

(57) ABSTRACT

When the driving force between a driven wheel of a wheel and the surface on which the vehicle is travelling exceeds the available traction, wheel slippage may occur. Wheel slippage may result in a loss of control of the vehicle. The present disclosure may facilitate the control of drive power sent to a driven wheel of a vehicle from consideration of a torque setting and a speed of the vehicle.

17 Claims, 4 Drawing Sheets

(51) Int. Cl.
*F16H 61/472* (2010.01)
*F16H 61/475* (2010.01)

(56) References Cited

U.S. PATENT DOCUMENTS

| | | | |
|---|---|---|---|
| 2009/0143191 A1 | 6/2009 | Hubbard | |
| 2009/0265065 A1 | 10/2009 | Ikari | |
| 2013/0085036 A1 | 4/2013 | Anderson | |
| 2014/0069092 A1* | 3/2014 | Elliott | F16H 61/431 60/445 |

FOREIGN PATENT DOCUMENTS

| | | |
|---|---|---|
| DE | 102008025683 A1 | 7/2009 |
| JP | 5092069 | 4/1993 |
| JP | 5092071 | 4/1993 |

\* cited by examiner

METHOD AND APPARATUS FOR CONTROLLING THE DRIVE POWER OF A VEHICLE

CROSS-REFERENCE TO RELATED APPLICATIONS

This patent application claims the benefit of PCT Application No. US2013/020502, filed Jan. 7, 2013, which is incorporated by reference.

TECHNICAL FIELD

This disclosure relates to methods and apparatuses for controlling the drive power of a vehicle.

BACKGROUND

When the wheels of a vehicle are being driven so as to move the vehicle on a surface, the force at the rim of the wheel at the point of connection between the wheel and the ground is call the rimpull. When the rimpull of the driven wheels of the vehicle exceeds the available traction between the wheels and the surface, slippage between the wheels and the ground may occur. This slippage is often referred to as 'wheel-spin' and can result in the operator of the vehicle losing control of the vehicle.

The amount of rimpull may be decreased by reducing the torque with which the wheels are driven. A reduction in torque may result in the rimpull being reduced below the level of traction available, which should prevent slippage between the wheels and the surface.

Non-direct transmission systems, such as diesel electric, hydrostatic and hydrodynamic transmission systems, generate power in one form and transmit the power to the wheels of the vehicle in another form. For example, a working vehicle, such as a bulldozer or a snow plough, that has a hydrostatic transmission system may generate mechanical power from an internal combustion engine, such as a diesel engine, and transmit the generated power to the vehicle wheels and any ancillary devices, such as a scoop or plough, via the hydrostatic transmission using hydraulic power.

The power sent by the hydrostatic transmission to the wheels of the vehicle, i.e. the torque applied to the wheels of the vehicle, may be determined by a control system. In some situations, it may be desirable to reduce the amount of power applied to the wheels in order to reduce the rimpull and therefore reduce the chance of wheel slippage.

U.S. Pat. No. 5,613,581 describes a vehicle with an electrohydraulic control device where the position of an impeller clutch pedal is used to determine an impeller clutch pressure level (which affects the power sent by the electrohydraulic device to the wheels of the vehicle). A user of the vehicle may reduce the power sent to the wheels by selecting a desired rimpull setting. The desired rimpull setting is a percentage of the maximum available rimpull (i.e. 60% of maximum rimpull). By selecting a rimpull reduction setting, the impeller clutch pressure level determined from the impeller clutch pressure curve is reduced by the selected percentage. Consequently, the torque applied to the wheels, and therefore the amount of rimpull at the wheels, may be reduced using the rimpull reduction setting.

In some conditions, however, as a consequence of rimpull reduction, there may be insufficient rimpull for carrying out certain activities, such as when the vehicle is trying to climb a steep incline or push materials to the top of a pile.

SUMMARY

The present disclosure relates to a method for controlling a drive power sent to a driven wheel of a vehicle, wherein:
  a drive power sent to a driven wheel is determined from a torque setting and a speed of the vehicle.

The present disclosure also relates to a controller for controlling a drive power sent to a driven wheel of a vehicle, the controller being arranged to:
  determine a drive power to be sent to a driven wheel of the vehicle from a torque setting and a speed of the vehicle.

BRIEF DESCRIPTION OF THE DRAWINGS

A method and apparatus for controlling the drive power of a vehicle in accordance with the present disclosure is described by way of example only with reference to the accompanying drawings, in which.

DETAILED DESCRIPTION

Figure 1:
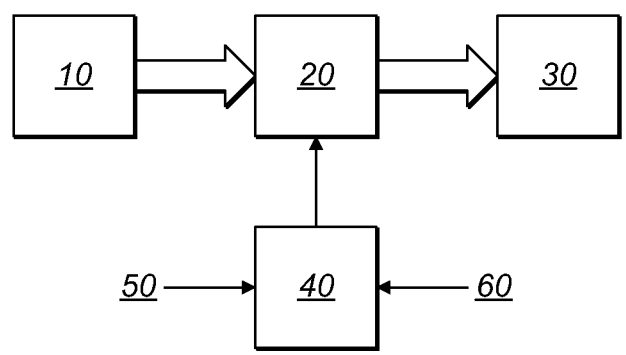
FIG. 1 shows a schematic drawing of a power system for a vehicle having an engine, a non-direct transmission system, at least one driven wheel and a controller.

FIG. 1 shows a schematic drawing of a power system 100 which has an engine 10 with a hydrostatic, non-direct transmission system 20. The hydrostatic system (hystat) 20 sets a pressure at its output that determines the amount of power sent to the at least one driven wheel 30 of a vehicle within which the power system 100 may be located.

The pressure at the output of the hystat 20 may be dependent on a number of factors and is controlled by a controller 40. The controller may set the pressure at the output of the hystat, and therefore the amount of power sent to the wheels 30, on the basis of a torque setting 50 and a vehicle speed 60.

The torque setting 50 may be set by an operator of the vehicle and it may be used to reduce the rimpull of the wheels 30. For example, the operator may have a choice of selecting a torque setting of 80%, 90%, and 100%, wherein a setting of 100% represents full torque for a given vehicle speed, 90% represents a torque of 90% of the full torque, etc.

The vehicle speed 60 may be determined a number of different ways, for example, it may be the speed of the vehicle relative to the surface across which it is travelling, which may be determined using any standard technique. Alternatively, it may, for example, be an angular speed of a motor turning the wheels 30 of the vehicle 100.

Figure 2:
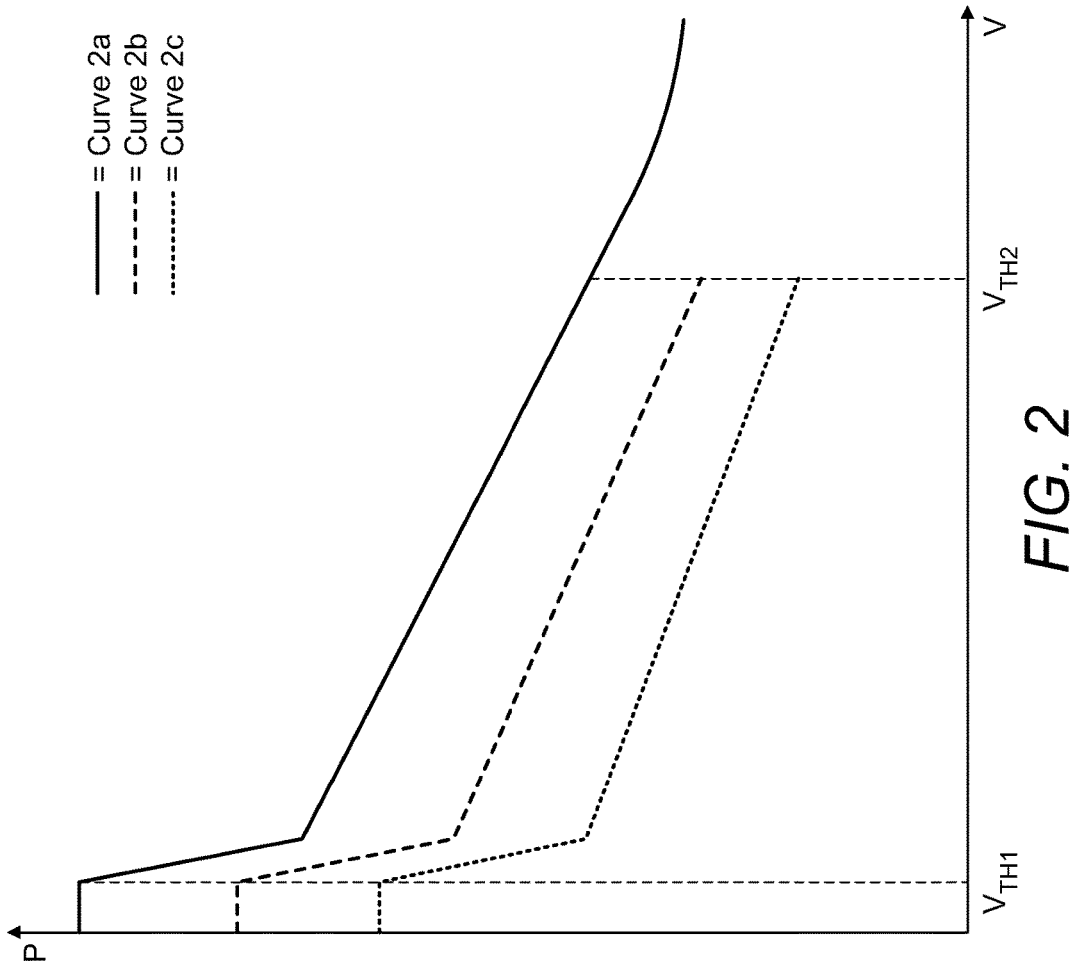
FIG. 2 shows a graph representing how the power sent to the driven wheel may be controlled in the power system of FIG. 1 in accordance with a first embodiment of the disclosure.

FIG. 2 shows a graph representing how the controller 40 may set the power sent to the driven wheels of the vehicle by adjusting the hystat output pressure in consideration of the torque setting 50 and the vehicle speed 60. Each curve on the graph represents a different torque setting and in the example shown in FIG. 2, curve 2a represents a torque setting of 100%, curve 2b a torque setting of 90% and curve 2c a torque setting of 80%.

By selecting, for example, a torque setting of 80%, the hystat pressure, and therefore also the rimpull, may be reduced. This should reduce the possibility of wheel slippage.

As can be seen from FIG. 2, at vehicle speeds between a lower vehicle speed threshold $V_{TH1}$ and an upper vehicle speed threshold $V_{TH2}$, a decrease in vehicle speed may result in an increase in hystat pressure, and therefore also increase in drive power and rimpull, for all curves. The vehicle speed threshold $V_{TH2}$ may be set at a level below which the vehicle may be expected to be carrying out operations that may require an increased level of drive power. This shall be explained in more detail below. For example, $V_{TH2}$ may be set to 12 KPH.

The lower vehicle speed threshold $V_{TH1}$ may be set to a level below which a further increase in drive power may not necessarily be useful, because, for example, a further increase in drive power might be expected to cause slippage. Therefore, for further decreases in vehicle speed when the speed is below $V_{TH1}$, the power sent to the driven wheels may stay the same. $V_{TH1}$ may, for example, be set to 0.5 KPH, or alternatively may be set to 0 KPH, such that for all forward vehicle speeds below 12 KPH, any decrease in vehicle speed may always result in an increase in power sent to the driven wheel.

The shape of the curves shown in FIG. 2 results in increased power at low to medium speeds, which may be useful in some vehicle operations, for example, when carrying material up a steep incline, or pushing material to the top of a pile. If the hystat output pressure for a particular torque setting were the same for all vehicle speeds, the vehicle might struggle to perform such functions as the required power to carry out such low speed, high power operations might not be available. In the arrangement shown in FIG. 2, as the vehicle speed decreases as a consequence of, for example, climbing up a steep incline, drive power increases to ensure that there will be a sufficient amount of power to continue to climb, whilst still giving the operator the option of decreasing the power by changing the torque setting if slippage should become an issue.

As can also be seen from FIG. 2, the shape of the curves for each of the different torque settings is very similar because curves 2b and 2c are scaled from curve 2a. This means that the operator of the vehicle should feel that the vehicle is responding in the same way regardless of the torque setting because for each torque setting, the output pressure of the hystat 20, and therefore the drive power and rimpull, will change similarly with vehicle speed changes. Therefore, the vehicle operator will not need to change their driving style on the basis of the torque setting.

The shape of curve 2a may be set to any suitable shape, taking into consideration the expected operating conditions of the vehicle. Scaling of curves 2b and 2c may be achieved by any technique well known to the person skilled in the art.

Figure 3:
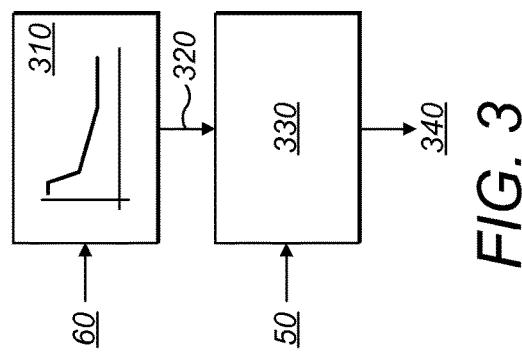
FIG. 3 shows a process by which the power control of FIG. 2 may be executed.

FIG. 3 shows an example of how the curves 2a, 2b and 2c may be achieved. A particular curve profile map 310 may first be devised and stored. As can be seen from FIG. 3, in this example the curve profile map 310 has the same shape as curve 2a of FIG. 2. The vehicle speed 60 may be input to the profile map 310, which may return a scale factor 320 for that particular vehicle speed 60 input. The hystat output pressure level 340 may then be determined using a calculation 330. The calculation 330 multiplies a fixed pressure value (COR) by the scale factor 320 and the torque setting 50 percentage, as follows:

Hystat output pressure level 340=scale factor 320×
CORxtorque setting 50 percentage Consequently, when the torque setting 50 is 100% (curve 2a), the output hystat pressure level 340 may be the COR multiplied by the scale factor 320 that is returned by 310 for the current vehicle speed 60. When the torque setting is 90% (curve 2b), the hystat output pressure level 340 may be the COR multiplied by the scale factor 320 that is returned by 310 for the current vehicle speed 60 multiplied by 0.9.

The fixed pressure value COR may be the hystat crossover relief, which may be, for example, the maximum allowable hystat pressure, such as 450 bar or 470 bar.

When the vehicle speed is above VTH2, it may be assumed that the vehicle is roading, for example moving from site to site. It may be useful in those circumstances automatically to provide the full capability of the machine to the operator, without the operator having manually to selected a torque setting of 100%. Therefore, it may be arranged that when the vehicle speed 60 is above the threshold vehicle speed $V_{TH2}$, the hystat output pressure will be the same regardless of the torque setting 50.

This can be seen in FIG. 2, wherein for vehicle speeds above $V_{TH2}$, the hystat output pressure is at the level it would be with no torque reduction (i.e. a torque setting of 100%), regardless of the torque setting. As such, when the vehicle speed is above $V_{TH2}$, the hystat output pressure level 340 may be set merely by multiplying the COR by the scale factor 320 for the current vehicle speed, regardless of what the torque setting is. Alternatively, the process shown in FIG. 3 may be bypassed altogether and the hystat output pressure simply be set to equal the COR. The curve profile map 310 and COR may be matched such that the hystat output pressure increases or decreases when the vehicle speed increases to cross $V_{TH2}$.

As a consequence of this, the vehicle may perform low speed, high power operations when the vehicle speed is below $V_{TH2}$, and perform consistent high speed operations when the vehicle speed is above $V_{TH2}$.

Figure 4:
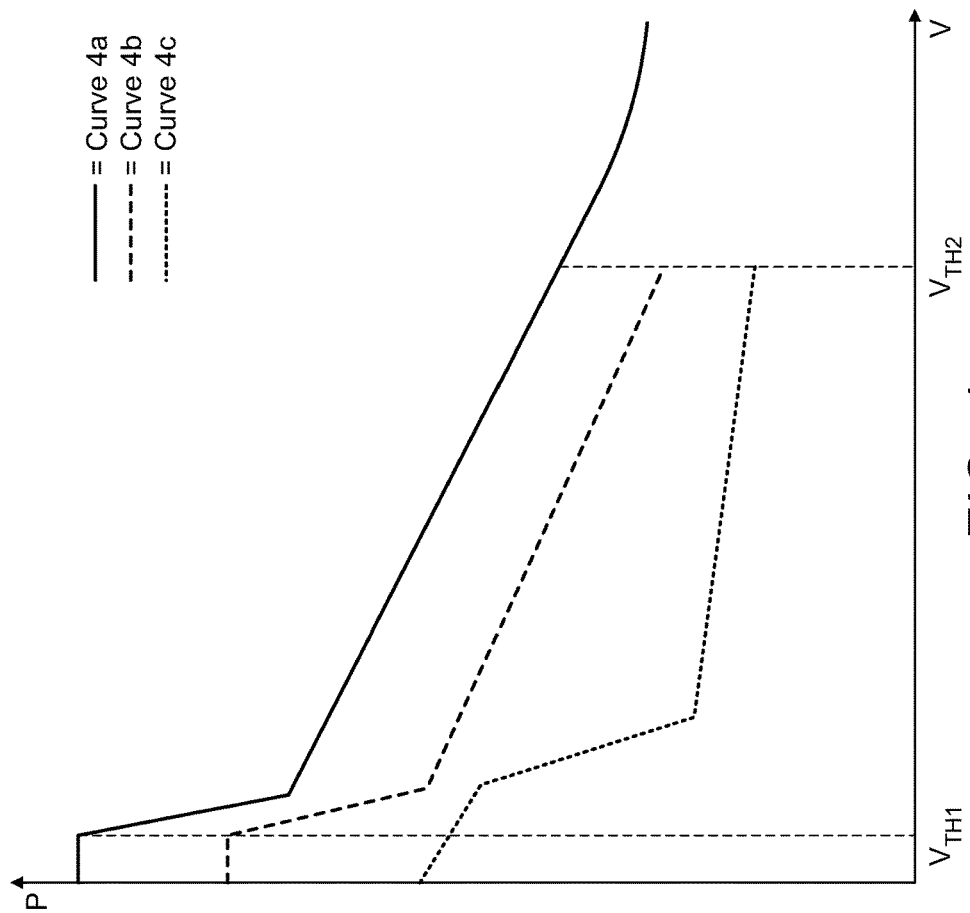
FIG. 4 shows a graph representing how the power sent to the driven wheel may be controlled in the power system of FIG. 1 in accordance with a second embodiment of the disclosure.
Figure 6:
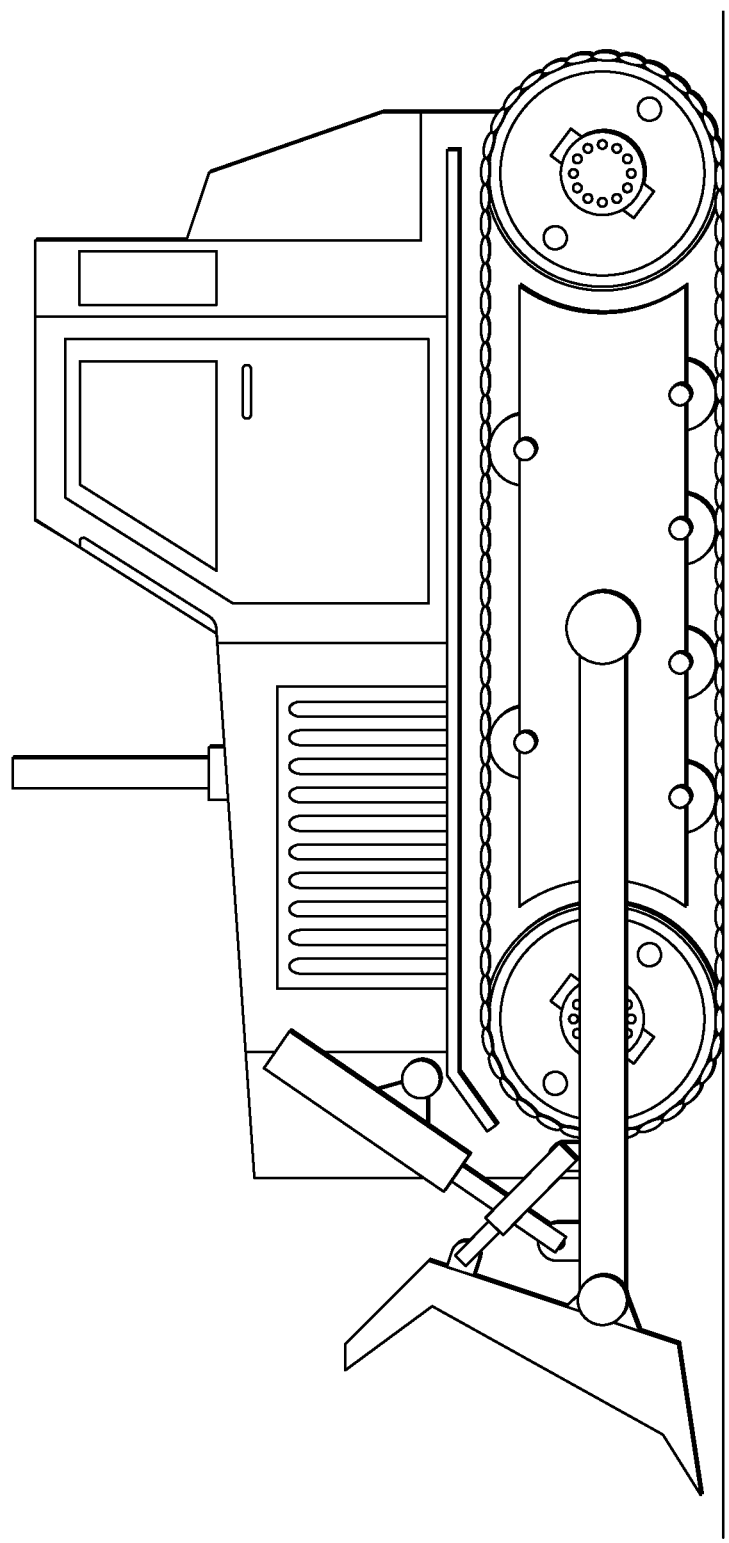
FIG. 6 shows a vehicle within which the power system of FIG. 1 may be used.

FIG. 4 shows a further graph representing a further way in which the controller 40 may set the hystat output pressure by considering the torque setting 50 and the vehicle speed 60.

The graph in FIG. 4 is very similar to that of FIG. 2, but curve 4c has quite a different shape to the other curves (4a and 4b) on the graph. In the example shown in FIG. 4, curve 4c represents a relatively low torque setting, for example 60%, and has a shape whereby the hystat output pressure is kept very low for most vehicle speeds below $V_{TH2}$, and only starts to increase significantly when the vehicle speed is very low. In consequence of the shape of curve 4c, the vehicle speed 60 at which the hystat output pressure begins to increase significantly is slower than the vehicle speed 60 at which the hystat pressure begins to increase significantly for the other curves (4a and 4b) shown in FIG. 4.

Figure 5:
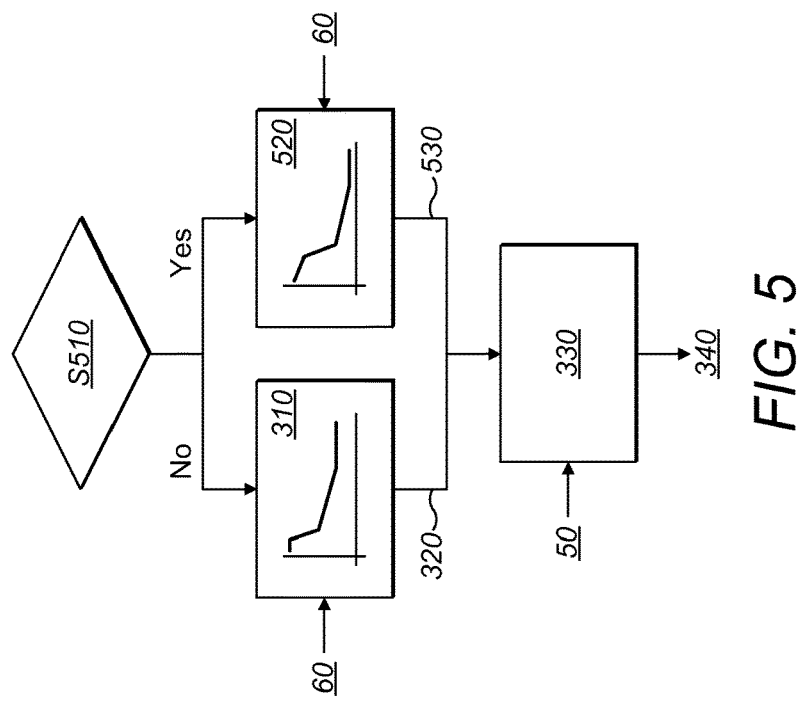
FIG. 5 shows a process by which the power control of FIG. 4 may be executed.

FIG. 5 shows an example of how this may be achieved. The process shown in FIG. 5 is very similar to that of FIG. 3, but it begins with a Step S510 that determines whether or not a low torque setting 50 has been selected. A low torque setting may be considered to be any setting below a threshold value, for example any torque setting of 60% or less, whereby use of the alternative shape curve may be useful.

If Step S510 determines that a low torque setting has not been selected, the process may proceed to the curve profile map 310 and the hystat output pressure level 340 is determined in the same way as described in respect of FIG. 3 above.

If Step S510 determines that a low torque setting has been selected, the process may proceed to the curve profile map 520. As can be seen from FIG. 5, the profile map 520 has a similar shape to curve 4c shown in FIG. 4. The vehicle speed 60 may be input to the profile map 520, which may return a scale factor 530 for that particular vehicle speed 60 input. This scale factor 530 may then be used by the equation 330 in the same way as described above with respect to FIG. 3 in order to determine the hystat output pressure level 340.

The second curve profile map 520 may be particularly useful for snow plough operations wherein the vehicle is operating on snow and/or ice with only very limited traction. Consequently, when the operator has selected a low torque setting, for example 60%, they will generally desire a low rimpull for most vehicle speeds below $V_{TH2}$ in order to avoid slippage, but an increase in rimpull at very low vehicle speeds may still be useful for pushing or carrying snow to the top of a pile, which is generally carried out at very low speeds. Thus, the chance of slippage is reduced by low rimpull at most speeds, but enough power is still available for very low speed, high power operations.

The second curve profile map 520 may have the same upper and lower vehicle speed thresholds as the first curve profile map 310 i.e. $V_{TH1}$ and $V_{TH2}$, or they may be different. Most preferably, the upper threshold will be $V_{TH2}$ for both maps so that the hystat output power may be the same for all vehicle speeds above $V_{TH2}$, regardless of the torque setting 50, but the lower threshold may be different for the two maps, as is shown in FIG. 4, where for curve 4c the power output continues to rise for decreases in vehicle speed below $V_{TH1}$.

For both the embodiments shown in FIGS. 2 and 4, if the operator changes from one torque setting to another whilst operating the vehicle, it may be arranged that the hystat output pressure changes gradually between the respective curves. This ensures that the operator does not experience a rapid shift in rimpull, which might make control of the vehicle difficult.

Whilst it is not shown in either FIG. 2 or 4, it may be arranged that for some very low torque settings, for example torque settings of 50% or less, the hystat output pressure may be fixed at a single value for all vehicle speeds. The fixed single value may be the COR multiplied by the torque setting percentage. For example, a torque setting of 40% may result in the hystat output pressure being fixed to 40% of COR for all vehicle speeds. This is because if the operator has requested a very large rimpull reduction by selecting a torque setting below 50%, it is likely that traction is so poor that any increase from a very low hystat output pressure is highly likely to result in slippage, and so any increases in the hystat output pressure should be avoided.

This may be implemented by bypassing the processes shown in FIGS. 3 and 5 when a very low torque setting is selected and merely fixing the hystat output pressure as described in the above paragraph.

FIG. 1 shows a controller 40 in accordance with an aspect of the present disclosure.

The controller 40 may be configured to carry out the control process described in the present disclosure.

The controller 40 may have a number of inputs that may be used in order to determine how the hystat output pressure should be controlled. For example, the inputs might include, but are not limited to, the torque setting 50 and the vehicle speed 60. The controller 40 may also have one or more outputs that may be used to control the hystat output pressure.

The controller 40 may be implemented in a machine control unit, for example the Caterpillar A4:M1 or A5:M12, or as a standalone control unit.

Although embodiments of the disclosure have been described above, the skilled person will contemplate various modifications. Rather than using a hystat transmission, the vehicle may instead have any form of transmission that enables a controller to set the power sent to the driven wheel of the vehicle, for example a diesel electric or hydrodynamic transmission system.

Whilst in the embodiments above, the operator of the vehicle must select the torque setting, the torque setting may alternatively be selected automatically, for example by a control system on the basis of a measurement of wheel slippage.

Furthermore, whilst the embodiments show three different torque settings being available to the operator, there may in fact be any number of different torque settings available. Alternatively, rather than having a number of discrete, pre-set torque settings available for selection, a particular torque setting of anywhere between 0%-100% may be input to the controller 40 either by the operator or a control system. In this way, the selected torque setting may be infinitely variable.

Whilst only one torque setting in FIG. 4 has the modified shape of curve 4c, it may be arranged that more than one of the torque settings has such a shape.

INDUSTRIAL APPLICABILITY

The present disclosure finds application in the reduction of slippage between the wheels of a vehicle and the surface on which the vehicle is travelling, whilst still enabling the vehicle to perform low speed, high power operations.

The invention claimed is:

1. A method for controlling a drive power sent to a driven wheel of a vehicle, the method comprising:
   determining the drive power based on a torque setting and a speed of the vehicle;
   increasing the drive power sent to the driven wheel in response to
   a reduction in the speed of the vehicle, and
   the speed of the vehicle being between a first vehicle speed threshold and a second vehicle speed threshold, the second vehicle speed threshold being greater than the first vehicle speed threshold;
   selecting the torque setting from a torque settings list, the torque settings list including
   a first torque amount, and
   a second torque amount; and
   decreasing the drive power sent to the driven wheel in response to
   changing the torque setting from the first torque amount to the second torque amount, and
   the speed of the vehicle being between the first vehicle speed threshold and the second vehicle speed threshold.

2. The method of claim 1, wherein the torque settings list further includes a third torque amount,
   the method further comprising selecting the third torque amount from the torque settings list,
   wherein, when the speed of the vehicle is between the first vehicle speed threshold and the second vehicle speed threshold, a magnitude of the drive power corresponding to selection of the third torque amount is less than or equal to a magnitude of the drive power corresponding to selection of the second torque amount.

3. The method of claim 2, further comprising determining the drive power sent to the driven wheel without consideration of the torque setting when the speed of the vehicle is above the second vehicle speed threshold.

4. The method of claim 2, wherein
the first torque amount is associated with a first drive power-vehicle speed curve that is used to determine the drive power sent to the driven wheel when the first torque amount is selected, and
the second torque amount is associated with a second drive power-vehicle speed curve that is used to determine the drive power sent to the driven wheel when the second torque amount is selected.

5. The method of claim 4, wherein, for vehicle speeds below the second vehicle speed threshold, the second drive power-vehicle speed curve is scaled from the first drive power-vehicle speed curve.

6. The method of claim 5, wherein the third torque amount is associated with a third drive power-vehicle speed curve that is used to determine the drive power sent to the driven wheel when the third torque amount is selected.

7. The method of claim 4, wherein the third torque amount is associated with a third drive power-vehicle speed curve that is used to determine the drive power sent to the driven wheel when the third torque amount is selected.

8. The method of claim 1, further comprising gradually changing the drive power sent to the driven wheel over a period of time when a change in the torque setting results in a change in the drive power sent to the driven wheel.

9. The method of claim 1, further comprising determining the drive power sent to the driven wheel without consideration of the torque setting when the speed of the vehicle is above the second vehicle speed threshold.

10. The method of claim 1, wherein the vehicle comprises an engine and a non-direct transmission system, and
wherein an output pressure of the non-direct transmission system sets the drive power sent to the driven wheel.

11. The method of claim 1, wherein
the first torque amount is associated with a first drive power-vehicle speed curve that is used to determine the drive power sent to the driven wheel when the first torque amount is selected, and
the second torque amount is associated with a second drive power-vehicle speed curve that is used to determine the drive power sent to the driven wheel when the second torque amount is selected.

12. The method of claim 1, further comprising gradually changing the drive power sent to the drive wheel over a period of time when a change in the torque setting results in a change in the drive power sent to the driven wheel.

13. The method of claim 1, further comprising determining the drive power sent to the driven wheel without consideration of the torque setting when the speed of the vehicle is above the second vehicle speed threshold.

14. The method of claim 1, wherein the vehicle comprises an engine and a non-direct transmission system, and
wherein an output pressure of the non-direct transmission system sets the drive power sent to the driven wheel.

15. A controller for controlling a drive power sent to a driven wheel of a vehicle, the controller being configured to:
determine the drive power sent to the driven wheel of the vehicle based on a torque setting and a speed of the vehicle;
increase the drive power sent to the driven wheel in response to
a reduction in the speed of the vehicle, and
the speed of the vehicle being between a first vehicle speed threshold and a second vehicle speed threshold, the second vehicle speed threshold being greater than the first vehicle speed threshold;
receive a selection of the torque setting from a torque settings list, the torque settings list including
a first torque amount, and
a second torque amount; and
decrease the drive power sent to the driven wheel in response to
changing the torque setting from the first torque amount to the second torque amount, and
the speed of the vehicle being between the first vehicle speed threshold and the second vehicle speed threshold.

16. An engine unit comprising:
an engine;
a non-direct transmission unit coupled to the engine; and
the controller of claim 15 for controlling a power output of the non-direct transmission unit.

17. A wheeled vehicle comprising the engine unit of claim 16.

* * * * *